United States Patent Office 3,184,480
Patented May 18, 1965

3,184,480
PROCESS FOR PREPARING ESTERS OF 2,2,4,4-TETRAMETHYL-TETRAHYDRO-3-FURANOL
Wayne V. McConnell and William H. Moore, Kingsport, Tenn., assignors to Eastman Kodak Company, Rochester, N.Y., a corporation of New Jersey
No Drawing. Filed Dec. 4, 1962, Ser. No. 242,055
8 Claims. (Cl. 260—347.4)

This invention relates to esters of tetrahydro-2,2,4,4-tetramethyl-3-furanol and to a process of preparing them.

We have discovered that 3,4-epoxy-2,2,4-trimethylpentyl ester compounds undergo rearrangement in the presence of an acid catalyst to form tetrahydro-2,2,4,4-tetramethyl-3-furanol ester compounds. The reaction is illustrated, but not limited, by the following equation:

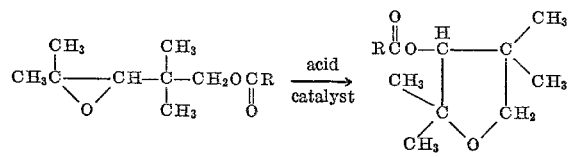

wherein R represents an alkyl group, a monocyclic aryl nucleus or an aralkyl group, for example. The nature of the ester group appears to have little or no effect on the process of our invention. It was unexpected to find that 3,4-epoxy-2,2,4-trimethylpentyl ester compounds rearranged in the presence of an acid catalyst to form tetrahydro - 2,2,4,4 - tetramethyl-3-furanol ester compounds rather than give the normal epoxy ring-opening reactions.

Temperatures of from about 0° C. to about 200° C. can be employed in carrying out the process of our invention. Temperatures below or above this range can be employed but apparently offer no advantages over the prescribed range. The optimum operating conditions vary with the acid catalyst employed. Preferably the reaction is carried out at a temperature of from about 25° C. to about 100° C. The reaction can be carried out either in the liquid phase or the vapor phase. Inert diluents such as toluene and xylene, for example, can be employed for convenience but generally are unnecessary.

As indicated hereinbefore the process of our invention is carried out in the presence of an acid catalyst. Boron trifluoride, phosphoric acid, sulfuric acid, hydrochloric acid, p-toluenesulfonic acid, alkanesulfonic acids (e.g., methane sulfonic acid, ethane sulfonic acid, etc.), alkanedisulfonic acids such as methane disulfonic acid, solid acidic catalysts such as ion exchange resins, silica-alumina, silica-magnesia and polyphosphoric acid on kieselguhr, for example, are illustrative of the acid catalysts that can be employed in carrying out the novel process of our invention.

When R is an alkyl group it is ordinarily an alkyl group having 1 to 21 carbon atoms such as methyl, ethyl, propyl, butyl, isobutyl, pentyl, hexyl, heptyl, octyl, nonyl, decyl, hendecyl, dodecyl, tridecyl, tetradecyl, pentadecyl, or hexadecyl (cetyl), for example, phenyl, tolyl (o, m or p), methoxyphenyl (o, m or p) ethoxyphenyl (o, m or p) and xylyl are illustrative of the monocyclic aryl nuclei R can represent. Similarly benzyl and phenethyl are illustrative of the aralkyl groups represented by R.

The new ester compounds of our invention are excellent solvents for organic materials and can be used as solvents for fats, waxes and resins. They are readily converted to the known compound tetrahydro-2,2,4,4-tetramethyl-3-furanol by saponification using known procedures. This latter compound is likewise an excellent solvent for organic materials such as those just mentioned. The new ester compounds of our invention are also of value as plasticizers for vinyl polymers such as polyvinyl chloride. Tetrahydro-2,2,4,4-tetramethyl-3-furyl stearate, for example, is a plasticizer for polyvinyl chloride. The new esters have excellent thermal stability and are resistant to hydrolysis.

The 3,4-epoxy-2,2,4-trimethylpentyl ester compounds from which the new tetrahydro-2,2,4,4-tetramethyl-3-furanol ester compounds of our invention are prepared are readily obtainable from 2,2,4-trimethyl-3-pentenyl esters by epoxidizing them in accordance with known epoxidation procedures. Epoxidation can be carried out using an organic peracid such as peracetic acid. The 2,2,4-trimethyl-3-pentenyl esters can be prepared by pyrolysis of 2,2,4-trimethyl-1,3-pentanediol diester compounds in accordance with the general procedure descrcibed in Hagemeyer and Hull U.S. Patent 2,941,011 issued June 14, 1960. The preparation of 2,2,4-trimethyl-3-penten-1-ol acetate and 2,2,4-trimethyl-3-penten-1-ol isobutyrate, for example, is specifically described in this U.S. patent. The esters may also be prepared by esterification of 2,2,4-trimethyl-3-penten-1-ol with the desired acid.

The following examples illustrate our invention. Parts are expressed as parts by weight.

EXAMPLE 1

*Preparation of 3,4-epoxy-2,2,4-trimethyl-1-pentyl isobutyrate*

A mixture of 500 parts of 2,2,4-trimethyl-3-pentenyl isobutyrate and 30 parts of anhydrous sodium acetate was stirred vigorously and cooled to 20° C. To this mixture 500 parts of a 40% (by weight) solution of peracetic acid in acetic acid was added dropwise during 1.5 hours, maintaining the temperature at 23–27° C. by means of an ice-water bath. When the addition was completed, the reaction mixture was stirred for an additional 3.5 hours at 23–27° C. It was then transferred to a separatory funnel containing 100 parts of benzene, washed until neutral and dried over magnesium sulfate. The product was distilled under reduced pressure, the epoxy ester (455 parts) being collected as the fraction boiling at 67–71°/0.6 mm.; $n_D^{20}$: 1.4321; $d_4^{25}$: 0.9419.

*Anal.*—Calculated for $C_{12}H_{22}O_3$: C, 67.3; H, 10.3; sap. eq., 214.3. Found: C, 67.3; H, 10.5; sap. eq., 214.9.

This procedure is useful for the preparation of all of the related epoxy esters mentioned herein.

EXAMPLE 2

*Preparation of tetrahydro-2,2,4,4-tetramethyl-3-furyl isobutyrate using a fixed-bed (acidic-type solid) catalyst*

A glass tube (1″ I.D.) equipped with a heating jacket was packed with silica-alumina pellets (⅛″) to a depth of 3 feet. The tube was placed in a vertical position and heated to 100° C. A heated storage vessel containing 3,4-epoxy-2,2,4-trimethylpentyl isobutyrate was connected to the tube. The epoxy ester was heated to 100° C. and was then added dropwise to the catalyst bed at a rate of 1 pound per hour. The product was collected in a receiver at the base of the tube. The receiver was maintained at 100° C. and was equipped with a pump to permit the effluent to re recycled through the catalyst. The recycled liquid was heated to 100° C. just prior to its contact with the catalyst. The recycling process was continued until the desired degree of conversion of the epoxy compound was obtained. The reaction was folloded by gas chromatography. A 1000 gram charge of the epoxy ester when treated in the above manner gave 790 grams of a product which was largely tetrahydro-2,2,4,4-tetramethyl-3-furyl isobutyrate (over 95% purity); B.P. range 66–79° C./2.0 mm.; $n_D^{20}$: 1.4307. A higher boiling fraction (192 grams) was also obtained; B.P. range 81–105° C./2.4 mm.; $n_D^{20}$: 1.4461.

EXAMPLE 3

*Preparation of tetrahydro-2,2,4,4-tetramethyl-3-furyl isobutyrate using boron trifluoride as catalyst*

A solution of 100 parts of tetrahydro-2,2,4,4-tetramethyl-3-furyl isobutyrate and 1 part of boron trifluoride was stirred and heated to 40° C. To this solution, 3-4-epoxy-2,2,4-trimethylpentyl isobutyrate and boron trifluoride were simultaneously admitted in separate streams using a ratio of 100 parts of the epoxy ester compound to 4 parts of boron trifluoride. The temperature was maintained at 40° C.±5° C. during the gradual addition of the epoxy ester and catalyst. The addition was continued until 1000 parts of the epoxy ester had been added. The reaction mixture was then cooled and washed with 1200 parts of a 10% aqueous sodium hydroxide solution followed by three washes with water using 750 parts of water for each wash. The reaction mixture was then distilled. 783 parts of tetrahydro-2,2,4,4-tetramethyl-3-furyl isobutyrate and 292 parts of the higher boiling composition referred to in Example 1 were obtained.

EXAMPLE 4

*Preparation of tetrahydro-2,2,4,4-tetramethyl-3-furyl isobutyrate using hydrogen chloride as catalyst*

To 500 parts of toluene, 3,4-epoxy-2,2,4-trimethylpentyl isobutyrate and hydrogen chloride were added simultaneously while stirring and maintaining a temperature of 25° C.–30° C. The above materials were added at such rates that the ratio (parts by weight) of the epoxy ester compound to hydrogen chloride was 10 to 1. The addition was continued until 1000 parts of epoxy ester and 100 parts of hydrogen chloride were used. The reaction mixture was then washed successively with 1000 parts of water and 1000 parts of 5% aqueous sodium hydroxide. Two additional washes with water (500 parts each) were used and the reaction mixture was then distilled. Seven hundred and thirteen (713) parts of tetrahydro-2,2,4,4-tetramethyl-3-furyl isobutyrate were obtained.

Other acid catalysts such as sulfuric acid, phosphoric acid, p-toluenesulfonic acid, alkane monosulfonic acids and alkane disulfonic acids, for example, can be used in place of hydrogen chloride in the foregoing example.

EXAMPLE 5

*Preparation of tetrahydro-2,2,4,4-tetramethyl-3-furyl acetate*

The procedure described in Example 3 was employed except 3,4-epoxy-2,2,4-trimethylpentyl acetate was used as the epoxy ester. In this preparation, a fraction boiling at 55° C.–70° C. at 1.0 mm. contained the tetrahydro-2,2,4,4-tetramethyl-3-furyl acetate. Six hundred and thirty-four (634) parts of this fraction was obtained from 1000 parts of the corresponding epoxy ester.

EXAMPLE 6

*Preparation of tetrahydro-2,2,4,4-tetramethyl-3-furyl stearate*

A solution of 41 parts of 3,4-epoxy-2,2,4-trimethylpentyl stearate (obtained following the procedure of Example 1 from the corresponding unsaturated ester, which was obtained by esterification of stearic acid with 2,2,4-trimethyl-3-penten-1-ol in the presence of titanium butoxide) in 50 parts of ether was treated with 70 parts of 2 N hydrogen chloride in ether. After one hour at room temperature, the ethereal solution was washed free of acid, dried over magnesium sulfate and the ether evaporated to give 38.4 parts of a viscous oil which was not distilled. Saponification of the crude ester afforded 90% of the theoretical amount of tetrahydro-2,2,4,4-tetramethyl-3-furanol.

EXAMPLE 7

*Preparation of tetrahydro-2,2,4,4-tetramethyl-3-furyl benzoate*

This ester was prepared from 3,4-epoxy-2,2,4-trimethylpentyl benzoate using the general procedure disclosed in Example 4. The fraction distilling at 102–119°/1.5 mm. was collected. On redistillation the ester was obtained in good purity; B.P.: 109–112° C./1.5 mm.; $n_D^{20}$: 1.5021.

EXAMPLE 8

*Preparation of tetrahydro-2,2,4,4-tetramethyl-3-furyl phenylacetate*

3,4-epoxy-2,2,4-trimethylpentyl phenylacetate was rearranged to the desired tetrahydrofuryl ester under the conditions described in Example 4. The latter was the main constituent in a fraction boiling at 120–147° C./1.8 mm. This fraction was redistilled to give tetrahydro-2,2,4,4-tetramethyl-3-furyl phenylacetate in 90% purity; B.P.: 131–136° C./2.0 mm.; $n_D^{20}$: 1.495.

The examples are illustrative, but not limitative, of how the process of our invention can be carried out. Thus, another acidic solid catalyst such as silica-magnesia can be used instead of silica-alumina in Example 2. Likewise, a supported catalyst such as polyphosphoric acid on kieselguhr can be used as the fixed-bed catalyst in Example 2.

Although the invention has been described in considerable detail with reference to certain preferred embodiments thereof, it will be understood that variations and modifications can be effected without departing from the spirit and scope of the invention as described hereinbefore and as defined in the appended claims.

We claim:

1. The process of preparing a tetrahydro-2,2,4,4-tetramethyl-3-furanol ester compound having the formula:

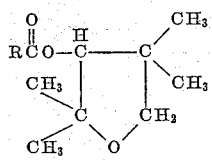

wherein R represents a member selected from the group consisting of alkyl having 1 to 21 carbon atoms, phenyl, tolyl, methoxyphenyl, ethoxyphenyl, xylyl, benzyl and phenethyl which comprises contacting a 3,4-epoxy-2,2,4-trimethylpentanol ester compound having the formula:

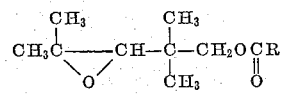

wherein R has the meaning previously assigned to it, with an acid catalyst.

2. Process in accordance with claim 1 wherein the process is carried out at a temperature of from about 0° C. to about 200° C.

3. Process in accordance with claim 1 wherein the process is carried out at a temperature of from about 25° C. to about 100° C.

4. Process in accordance with claim 2 wherein R represents alkyl having 1 to 21 carbon atoms.

5. Process in accordance with claim 2 wherein R is isobutyl.

6. Process in accordance with claim 2 wherein R is methyl.

7. Process in accordance with claim 2 wherein R is heptadecyl.

8. Process in accordance with claim 2 wherein R is phenyl.

References Cited by the Examiner
UNITED STATES PATENTS 3,020,253 2/62 Lukes _____ 260—347.4
3,046,284 7/62 Van Hook _____ 260—347.4

OTHER REFERENCES

Cheronis et al., Semimicro Qualitative Analysis (1947), pages 179–80.
Beilstein, vol. 17, first supplement (1934) page 53.

IRVING MARCUS, *Primary Examiner*.
JOHN D. RANDOLPH, NICHOLAS S. RIZZO,
*Examiners.*